United States Patent
Lee et al.

(10) Patent No.: US 9,658,349 B2
(45) Date of Patent: May 23, 2017

(54) APPARATUSES FOR AND METHODS OF GENERATING IMAGES

(71) Applicant: Samsung Electronics Co., Ltd., Suwon-Si, Gyeonggi-Do (KR)

(72) Inventors: Chae-hun Lee, Suwon-si (KR); Young Kim, Yongin-si (KR); Jae-chul Park, Suwon-si (KR); Yong-woo Jeon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 9 days.

(21) Appl. No.: 14/080,031

(22) Filed: Nov. 14, 2013

(65) Prior Publication Data
US 2014/0209804 A1 Jul. 31, 2014

(30) Foreign Application Priority Data
Jan. 25, 2013 (KR) .................... 10-2013-0008743

(51) Int. Cl.
*G01T 1/29* (2006.01)
*G01T 1/20* (2006.01)

(52) U.S. Cl.
CPC .......... *G01T 1/2985* (2013.01); *G01T 1/2008* (2013.01)

(58) Field of Classification Search
CPC ............................ G01T 1/2985; G01T 1/2008
See application file for complete search history.

(56) References Cited

U.S. PATENT DOCUMENTS

| 6,749,761 | B1* | 6/2004 | Andreaco | G01T 1/202 216/24 |
| 6,858,847 | B1* | 2/2005 | Macciocchi | 250/363.03 |
| 7,199,370 | B2 | 4/2007 | Xie et al. | |
| 7,601,963 | B2 | 10/2009 | Aykac et al. | |
| 7,626,389 | B2 | 12/2009 | Fiedler et al. | |
| 7,692,156 | B1* | 4/2010 | Nagarkar | G01T 1/1644 250/361 R |

(Continued)

FOREIGN PATENT DOCUMENTS

KR   20080009082 A   1/2008

OTHER PUBLICATIONS

Choong, "Timing resolution of scintillation-detector systems: a Monte Carlo analysis," Phys. Med. Biol. Nov. 7, 2009; vol. 54(21); Retrieved from internet [Feb. 14, 2015]; Retrieved from url <http:www.ncbi.nih.gov/pmc/articles/PMC2814442/pdf/nihms-172985>.*

(Continued)

*Primary Examiner* — Yara B Green
(74) *Attorney, Agent, or Firm* — Harness, Dickey & Pierce, P.L.C.

(57) ABSTRACT

An apparatus for generating an image may include a plurality of scintillator layers configured to convert an incident beam into an optical signal; a plurality of micro cells configured to turn on or off depending on whether or not the micro cells detect the optical signal; a reaction depth determining unit configured to detect a decay pattern of the optical signal, on the basis of on/off signals of the micro cells, and configured to determine a type of the scintillator layers with which the incident beam has reacted; and/or a reading unit configured to decide an occurrence location of the incident beam and then generates a photographed image.

14 Claims, 8 Drawing Sheets

(56) References Cited

U.S. PATENT DOCUMENTS

| | | |
|---|---|---|
| 8,003,948 B2 | 8/2011 | Haselman et al. |
| 8,436,312 B2 * | 5/2013 | Inadama ............... G01T 1/2008 |
| | | 250/332 |
| 2009/0121141 A1 * | 5/2009 | Eriksson et al. ......... 250/363.04 |
| 2013/0009066 A1 * | 1/2013 | Grazioso et al. ........ 250/363.03 |

OTHER PUBLICATIONS

Moses, William W., "Trends in PET imaging" Elsevier Science B.V., Nuclear Instruments and Methods in Physics Research A 471, 2001, pp. 209-214.

* cited by examiner

APPARATUSES FOR AND METHODS OF GENERATING IMAGES

CROSS-REFERENCE TO RELATED APPLICATION(S)

This application claims priority from Korean Patent Application No. 10-2013-0008743, filed on Jan. 25, 2013, in the Korean Intellectual Property Office (KIPO), the entire contents of which are incorporated herein by reference.

BACKGROUND

1. Field

Some example embodiments may relate to apparatuses for and/or methods of generating medical images.

2. Description of Related Art

In order to diagnose the patient, medical imaging equipment acquiring information of the inside of the human body as images provides information necessary to diagnose the disease. Currently, medical imaging methods used or being developed in the hospital are largely divided into methods of acquiring anatomical images and physiological images. First, there are imaging methods providing detailed anatomical images of the human body at high resolution, for example, Magnetic Resonance Imaging (MRI) or Computed Tomography (CT). These methods generate two-dimensional images on the cross-section of the human body, or generate high resolution three-dimensional images by using multiple two-dimensional images, to thus represent the exact location and shape of the organs within the human body. Second, a prime example of physiological imaging methods is, positron emission tomography (PET) which contributes to the diagnosis of the metabolic abnormalities by taking a photograph of the metabolic processes in the body.

Positron emission tomography is an imaging technology that a special radioactive tracer emitting positrons are created as a form of a component that participates in the metabolism of the human body, and the tracer is injected into the human body by way of intravenous injection or inhalation, and in the case of which positrons emitted from these tracers combine with electrons, two gamma-rays of about 511 keV which are emitted in opposite directions are detected by using an external device, thereby tracking the location of the tracer, and observing the distribution of these forms and the change to the distribution over time.

SUMMARY

Some example embodiments may provide apparatuses and/or methods of enhancing the resolution of PET images in a PET system that uses a digital photo multiplier, by determining a decay speed or a decay degree of an optical signal output from a scintillator.

In some example embodiments, an apparatus for generating an image may comprise a plurality of scintillator layers configured to convert an incident beam into an optical signal; a plurality of micro cells configured to turn on or off depending on whether or not the micro cells detect the optical signal; a reaction depth determining unit configured to detect a decay pattern of the optical signal, on the basis of on/off signals of the micro cells, and configured to determine a type of the scintillator layers with which the incident beam has reacted; and/or a reading unit configured to decide an occurrence location of the incident beam and then generates a photographed image.

In some example embodiments, the apparatus may further comprise a detecting determination unit configured to determine whether or not the incident beam is detected depending on the on/off signals of the micro cells.

In some example embodiments, the micro cells may be disposed in a form of a ring so that a light receiving surface is directed toward a center of the ring. The apparatus may further comprise a timing determination unit configured to determine validity of the incident beam depending on whether or not detecting timings of the micro cells from which on signals have been detected correspond to each other.

In some example embodiments, the reaction depth determining unit may be configured to determine whether or not a number of the on signals of the micro cells per hour are equal to or less than a threshold value, to thus detect decay time of the optical signal.

In some example embodiments, the reaction depth determining unit may be configured to determine whether or not an average value of intervals between the on signals of the micro cells is equal to or less than a threshold value, to thus detect decay time of the optical signal.

In some example embodiments, the reaction depth determining unit may be configured to detect the decay pattern of the optical signal based on a rate of decreasing of intervals between the on signals of the micro cells.

In some example embodiments, the apparatus may further comprise an energy determination unit configured to measure an energy level of the incident beam, to determine whether or not the detected optical signal is valid, based on the on/off signals of the micro cells.

In some example embodiments, the reading unit may be configured to determine the occurrence location of the incident beam depending on the type of the scintillator layers with which the incident beam has reacted.

In some example embodiments, a method of generating an image of an object by using a plurality of scintillator layers and a plurality of micro cells that detect an optical signal generated and output from the scintillator layers, wherein the micro cells are turned on or turned off, depending on whether or not the optical signal generated and output from the scintillator layers is detected, to thus output on/off signals, may comprise detecting a decay pattern of the optical signal based on the on/off signals of the micro cells; determining a type of the scintillator layers with which an incident beam has reacted; and/or determining an occurrence location of the incident beam.

In some example embodiments, the method may further comprise determining whether or not the incident beam is detected, depending on the on/off signals of the micro cells.

In some example embodiments, the micro cells may be disposed in a form of a ring, so that a light receiving surface is directed toward a center of the ring. The method for generating the image may further comprise determining validity of the incident beam depending on whether or not detection timings of the micro cells from which the on signals have been detected correspond to each other.

In some example embodiments, the determining the type of the scintillator layers with which the incident beam has reacted may comprise determining whether or not a number of the on signals of the micro cells per hour is equal to or less than a threshold value, to thus detect decay time of the optical signal.

In some example embodiments, the determining the type of the scintillator layers with which the incident beam has reacted may comprise determining whether or not an average value of intervals between the on signals of the micro cells is equal to or less than a threshold value, to thus detect the decay time of the optical signal.

In some example embodiments, the determining the type of the scintillator layers with which the incident beam has reacted may comprise detecting the decay pattern of the optical signal based on a rate of decreasing of intervals between the on signals of the micro cells.

In some example embodiments, the method may further comprise measuring an energy level of the incident beam; and/or determining whether or not the detected optical signal is valid based on the on/off signals of the micro cells.

In some example embodiments, the method may further comprise determining the occurrence location of the incident beam depending on the type of the scintillator layers with which the incident beam has reacted.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
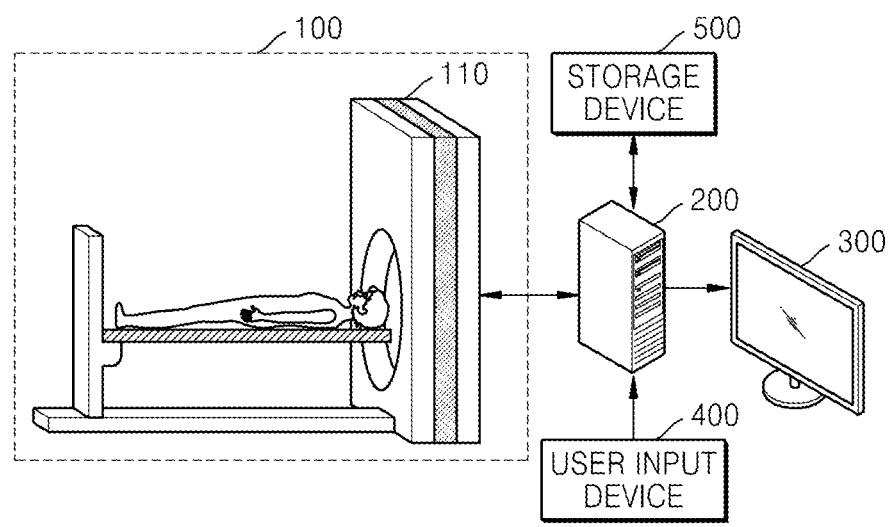
FIG. 1 is a view showing an apparatus for generating medical images, illustrating the overall system that generates the images for the cross-section of an object.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a view showing an apparatus for generating medical images, illustrating the overall system that generates the images regarding the cross-section of an object. Referring to FIG. 1, an apparatus for generating an image includes an imaging device 100, a computer 200, a display device 300, a user input device 400, and a storage device 500.

The image generating apparatus of FIG. 1 not only may generate the images for the cross-section of the object, but also may generate a system response of a detector 110 that is used for generating a medical image. The system response may represent a correction model of the detector 110. The correction model of the detector 110 is a model that is used for generating a high-resolution image, when the image is generated by using a signal which is obtained from the detector 110, or is used for correcting a low-resolution image to a high-resolution image. For example, the correction model of the detector may be a blur model so as to correct the spread of the image.

Two perspectives will be described below as a method of generating an image for the cross-section of an object by using an image generating apparatus of FIG. 1 and a method of generating a blur model of the detector 110. Here the term "blur" represents how widely a point or an image spreads, and more specifically, in the case of estimating the locations of a positron emission material that is located in the detected space of the detector using the detector 110, represents how widely the distribution of the estimated locations spreads from the location of the actual positron emission material. A person having ordinary skill in the art ("PHOSITA") may see that a point spread function (PSF) may be used to indicate the blur.

Further, the image generating apparatus obtains a signal that is emitted from the positron emission material that is located for each of location coordinates within the detected space of the detector 110 to thus generate the PSF for each of the location coordinates, As the PSF model is generated for the entire detected space of the detector 110 by summing all of these PSFs, the system response (or the blur model) for the detector 110 may be generated.

For example, in the case of generating the image for the cross-section of the object, by using the image generating apparatus of FIG. 1, the imaging device 100 detects a signal emitted from a tracer that has been injected into the object. The tracer is used as a term that refers to a substance that emits positrons. For example, the imaging device 100 detects the two gamma-rays that are emitted as positrons, emitted from the positron emission material injected into the human body of the object, are combined with surrounding electrons. The imaging device 100 transfers the Line-of-Response (LOR) data for the detected gamma-rays to the computer 200.

For example, in the case of generating the image for the cross-section of the patient's body, by using the image generating apparatus of FIG. 1, the imaging device 100 detects a signal that is emitted from a tracer that has been injected into the object. For example, the imaging device 100 detects the two gamma-rays which are emitted when positrons which are emitted from the positron emission material injected into the human body of the object are combined with surrounding electrons. The imaging device 100 transfers the LOR data for the detected gamma-rays to the computer 200.

For example, in the case of generating the blur model of the detector 110, by using the image generating apparatus of FIG. 1, the imaging device 100 detects the two gamma-rays which are emitted as positrons emitted from a point source which is located within the detector 110 are combined with surrounding electrons. The imaging device 100 transfers the LOR data for the detected gamma-rays to the computer 200. The LOR data represents the position of the straight line within a space, which will be described in more detail in FIG. 2.

Figure 2:
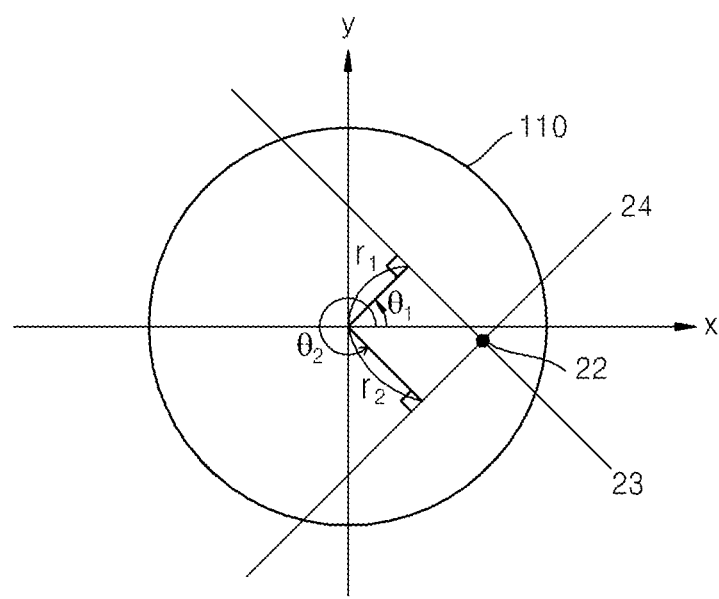
FIG. 2 shows an example of Line-of-Response (LOR) data.

FIG. 2 shows an example of the LOR data. Referring to FIG. 2, positrons are emitted from the tracer 22, which is located within the detector 110, and when the emitted positrons are combined with electrons, two gamma-rays are emitted in the direction of approximately 180 degrees relative to each other. The two gamma-rays are placed on one straight line. FIG. 2 shows an example in which two straight lines 23 and 24 are detected. Referring to the straight line 23, when a perpendicular line is drawn from the origin, which is within the detector 110, to the straight line 23, the distance from the origin to the perpendicular line is r1 and the angle formed between the x-axis and the perpendicular line is θ1, and the LOR data for the straight line 23 is (r1, θ1). Similarly referring to the straight line 24, when a perpendicular line is drawn from the origin, which is within the detector 110, to the straight line 24, the distance from the origin to the perpendicular is r2 and the angle between the x-axis and the perpendicular line is θ2, and the LOR data for the straight line 24 is (r2, θ2). As described above, when two or more pieces of the LOR data are obtained, the location of the tracer may be determined from the LOR data. The imaging device 100 transfers the LOR for the detected gamma-rays to the computer 200, and the computer 200 may finally determine the location of the tracer from the LOR.

Referring back to FIG. 1, the computer 200 uses the data that is obtained from the imaging device 100 and thus generates a medical image for the object. For example, in the case of generating a medical image of an object, by using the image generating apparatus of FIG. 1, the computer 200 uses the data that is obtained from the imaging device 100 and thus generates the medical image that represents the cross-section of the object. For example, in the case of generating the blur model of the detector 110, by using the image generating apparatus of FIG. 1, the computer 200 uses the data that is obtained from the imaging device 100 and thus generates the blur model of the detector 110.

The display device 300 displays the medical image or the blur model that is generated from the computer 200 on a display panel.

Users may enter information that is required to operate the computer 200 by using the user input device 400. For example, the users may command an operation start or operation end of the computer 200 by using the user input device 400.

Here, the computer 200 generates the medical image of the object, in which quality of the medical image is affected by a spatial resolution of the detector 110. In the case of PET, the spatial resolution may be degraded by the angle fluctuations of gamma-rays, the range of the positron before it is destroyed, and the geometrical structure of the detector.

For example, in the angle fluctuations of gamma-rays, since two gamma-rays that are emitted from a tracer are emitted while not forming exactly 180 degrees relative to each other but forming an angle slightly greater or smaller than 180 degrees, the resolution of the PET image is degraded. This phenomenon is called angle fluctuation, and hereinafter the example will be described with reference to FIG. 3.

Figure 3:
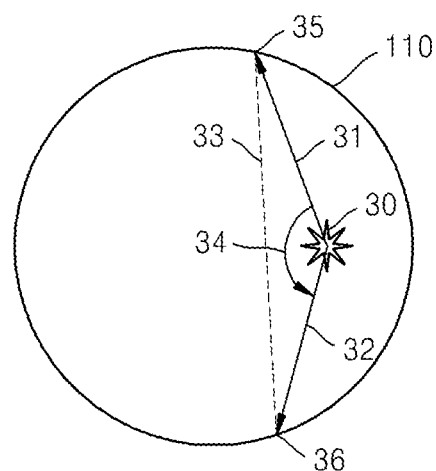
FIG. 3 shows an example of a case where two gamma-rays emitted from a tracer do not make a straight line.

FIG. 3 shows an example of a case where two gamma-rays emitted from a tracer do not make a straight line. FIG. 3 shows an example in which the two gamma-rays 31 and 32 are emitted from the tracer 30 while not forming exactly 180 degrees relative to each other, but forming an angle 34 slightly smaller than 180 degrees. In this case, the detector 110 recognizes the locations 35 and 36 in which the gamma-rays are detected, to thus estimate that the tracer is located on the straight line 33 that connects such two locations 35 and 36. In practice, however, the tracer does not exist on the straight line 33. Due to this problem, the resolution degradation of the PET image significantly becomes apparent as the diameter of the detector becomes bigger.

For example, in the case of the positron range, as positrons move from the tracer before the positrons react with electrons, the resolution of PET image is degraded. For example, after positrons have been emitted from the tracer, the positrons move by a short distance and lose energy. As the positrons are combined with electrons, they are destroyed and thus emit a pair of gamma-rays, which have the energy of about 511 keV. In this case, the distance that the positrons move while losing energy is called the positron range. As positrons emit gamma-rays after having moved by the positron range from the tracer, the position of the tracer and the position of the emitted gamma-rays do not exactly line up as predicted. Therefore, the positions of the emitted gamma-rays are calculated, and if the calculated location is assumed as the location of the tracer, there may be errors. The resolution degradation of PET due to these errors is called a positron range effect. In general, the higher the energy of the positrons, the longer the positron range becomes, and the resolution of the PET image is further degraded.

Figure 4:
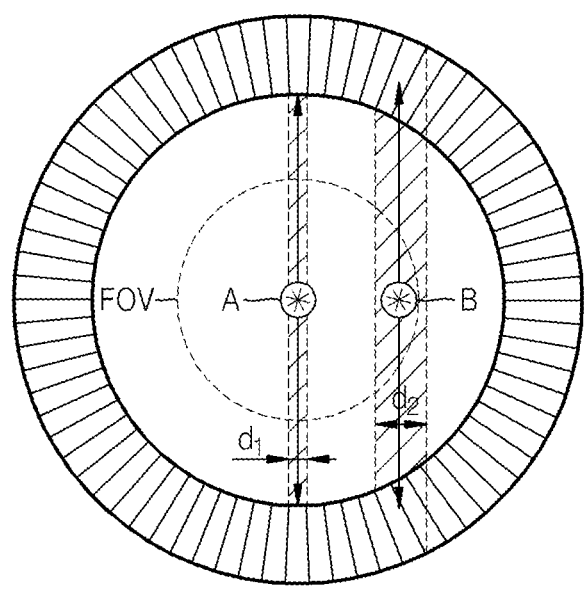
FIG. 4 is a view showing LOR according to the reaction depth difference of a positron and an electron.

FIG. 4 is a view showing the LOR according to the reaction depth difference of positrons and electrons. The image generating apparatus has a problem in that the resolution thereof is degraded as it goes farther from the center of the detector 110, due to the time difference that is caused by the location-specific reaction depth difference according to the geometric structure of the detector 110. For example, a plurality of detecting elements are compactly arranged on the surface of the detector 110. In the case that such depth detecting elements have the form of a rectangular shape that becomes longer in the depth direction, and the gamma-rays are obliquely incident onto the detecting elements, the gamma-rays are not detected by only one detecting element, but detected by the multiple adjacent detecting elements at the same time. Therefore it is difficult to estimate the exact location of the tracer, and resolution of the PET image is degraded.

Referring to FIG. 4, in the case that positrons react with electrons in the position A, the emitted gamma-rays are incident relatively perpendicularly onto the surface of the detector 110, and the distribution of the detecting element by which the gamma-rays are detected is much focused. However, in the case that the positrons react with the electrons in the position B, the gamma-ray may be detected by the multiple adjacent detecting elements at the same time, due to the fact that the emitted gamma-rays are obliquely incident onto the surface of the detector 110. Accordingly, the width of the LOR is widened as it goes from the center of the field of view (FOV) to the edge (e.g., width $d_1$ to width $d_2$), and the resolution of the PET image is degraded.

The resolution of the PET image is degraded by a variety of factors including the above three factors. Because some of these factors occur in probability, there is a limit in improving the resolution by technical or mechanical improvements. Therefore, to solve this problem, probability blur information that corresponds to each pixel within the detector 110 is generated in the form of a PSF, a blur model for the entire detector 110 is generated, and then the blur model of the detector 110 is applied reversely in the low-resolution of the PET image that is photographed by the detector 110 to thus generate a high-resolution image from which a blur has been removed.

According to some example embodiments, the detector 110, using a digital photo multiplier, is provided with a plurality of the scintillator layers, and detects which of the scintillator layers has reacted with the gamma-rays, to thus improve resolution of the PET images.

Figure 5:
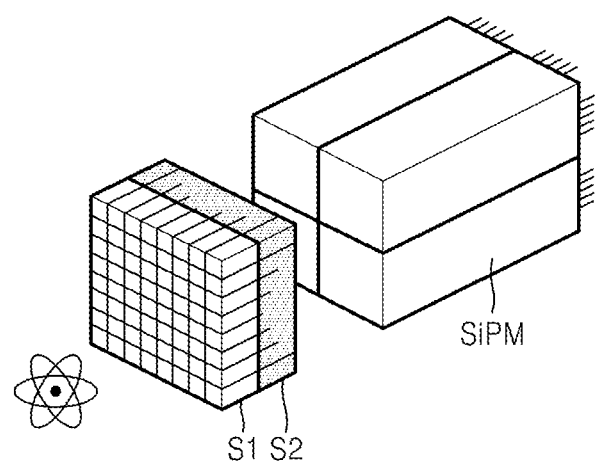
FIG. 5 is a perspective view illustrating a structure of a detector in accordance with some example embodiments.
Figure 6:
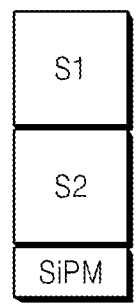
FIG. 6 is a cross-sectional view illustrating a structure of a detector in accordance with some example embodiments.

FIG. 5 is a perspective view illustrating a structure of a detector 110, and FIG. 6 is a cross-sectional view illustrating a structure of the detector 110 in accordance with some example embodiments.

The detector 110 in accordance with some example embodiments as shown in FIG. 4 has a structure in which detecting elements are placed in the form of a ring. The detector 110 may have a phoswich detector structure in which a plurality of the scintillator layers S1 and S2 are arranged. The detector 110 has a structure in which a plurality of the scintillator layers S1 and S2 are placed on a silicon photo multiplier SiPM. A light receiving surface of the scintillator layers S1 and S2 is placed to face toward the center of the ring, the scintillator layers S1 and S2 react with the incident beam that is emitted from the tracer 22, for example, gamma-rays. Herein, some example embodiments in which the incident beam are gamma-rays will be described. The gamma-rays that reacted with the scintillator layers S1 and S2 are converted into an optical signal (for example, visible light) to thus be emitted, and the silicon photo multiplier SiPM detects the optical signal that is emitted from the scintillator layers S1 and S2. The gamma-rays may react with one of a plurality of the scintillator layers S1 and S2.

According to some example embodiments, a light pipe may be placed between a plurality of the scintillator layers S1 and S2 and the silicon photo multiplier SiPM. The light pipe increases the path length of the optical signal that has been converted from the scintillator layer S1 or S2, to thus more accurately determine the reaction location of the gamma-rays.

The silicon photo multiplier SiPM consists of a plurality of pixels P. The plurality of pixels P are arranged in the form of an array on the rear surface of the scintillator layers S1 and S2.

Figure 7:
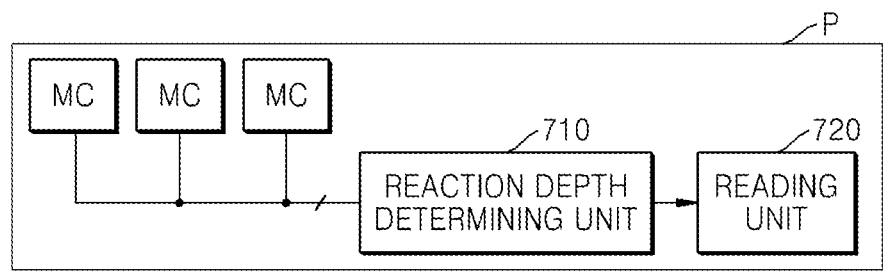
FIG. 7 is a view illustrating a structure of pixels of a silicon photo multiplier in accordance with some example embodiments.

FIG. 7 is a view illustrating a structure of pixels P of the silicon photo multiplier SiPM in accordance with some example embodiments.

Each of the pixels P may include a plurality of micro-cells MC, a reaction depth determining unit 710, and a reading unit 720.

The plurality of the micro-cells MC are arranged in the form of an array toward the scintillator layer S2 that is adjacent to the silicon photo multiplier SiPM. Each of the micro-cells MC may include a photodiode and may detect the optical signal output from the scintillator layers S1 and S2. As detecting the optical signal, each of the micro cells MC is turned on/off, and thus outputs a pulse signal.

A reaction depth determining unit 710 detects a decay signal of the optical signal, on the basis of the pulse signals of the plurality of the micro cells, and determines the type of the scintillator layers with which the gamma-rays have reacted. Because the plurality of the scintillator layers are made of different materials, a decay signal pattern from each of the scintillator layers is different. The reaction depth determining unit 710 determines that gamma-rays react with which of the scintillator layers, depending on the decay signal pattern, and determines the occurrence location of the gamma-rays on the basis of the scintillator layers with which the gamma-rays have reacted.

Figure 8:
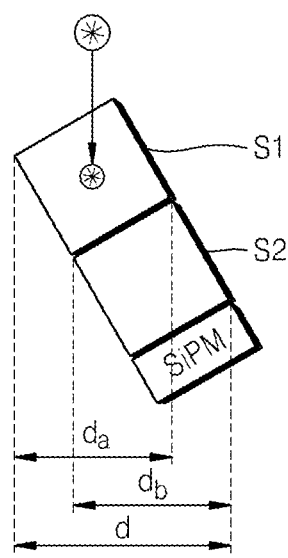
FIG. 8 is a view illustrating an example in which gamma-rays react with scintillator layers.

FIG. 8 is a view illustrating an example in which gamma-rays react with scintillator layers.

When the gamma-rays are incident onto the detector 110, as shown in FIG. 8, the gamma-rays may react with one of the plurality of the scintillator layers S1 and S2 of the detector 110. For example, as shown in FIG. 8, the first scintillator layer S1 may react with the gamma-rays. The reaction depth determining unit 710 detects that the gamma-rays have reacted with the first scintillator layer S1 by the decay signal that is output from the micro cells MC, and determines that the occurrence location of the gamma-rays is within da area.

According to some example embodiments, as shown in FIG. 8, the detection accuracy of the gamma-rays may be improved by using a plurality of the scintillator layers S1 and S2 that consist of different materials. If a single scintillator layer is used, the information that the area where gamma-rays have occurred is within d area may only be obtained. However, because the plurality of scintillator layers S1 and S2 are provided, the area where the gamma-rays have occurred may be distinguished between $d_a$ area and $d_b$ area, to therefore improving the resolution of the PET image.

Figure 9:
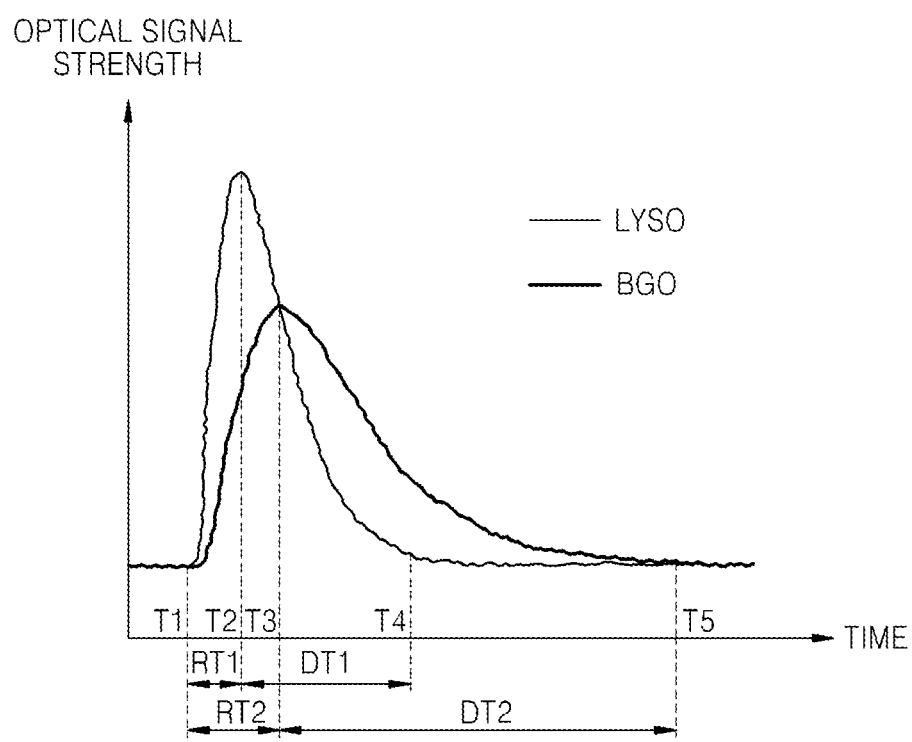
FIG. 9 is a view illustrating a pattern of an optical signal that is generated from a plurality of scintillator layers S1 and S2.

FIG. 9 is a view illustrating a pattern of an optical signal that is generated from a plurality of scintillator layers S1 and S2.

The optical signals that are generated from a plurality of scintillator layers S1 and S2, as shown in FIG. 9, represent different patterns depending on the material types of the scintillator layers. FIG. 9 represents the pattern of the optical signal that is converted and output from each of the plurality of scintillator layers S1 and S2, in the case that $Lu_{1.8}Y_{0.2}SiO_5$ (LYSO) and $Bi_4Ge_3O_{12}$ (BGO) are used as the first scintillator layer S1 and the second scintillator layer S2. As shown in FIG. 9, the patterns of the optical signals that are output from the scintillator layers that are made of the different materials are illustrated. The rise time RT1 (T2-T1) and the decay time DT1 (T4-T2) of the LYSO scintillator layer are much shorter than the rise time RT2 (T3-T1) and the decay time DT2 (T5-T3) of the BGO scintillator layer. In general, because the decay time is longer than the rise time, the type of scintillator layer with which the gamma-rays have reacted and the optical signals have occurred may be determined by detecting the decay signal.

The optical signal strength L(t) of the decay signal of the scintillator layer may be represented by Equation (1).

$$L(t) = a \cdot (1 - e^{-t/\tau_{rise}}) \cdot e^{-t/\tau_{decay}} \quad \text{Equation (1)}$$

Here, $\tau_{rise}$ represents the rise time constant, and $\tau_{decay}$ represents the decay time constant. $\tau_{rise}$ and $\tau_{decay}$ vary depending on the type of the scintillator layer. The constant "a" is a proportional constant that means the amount of light, and the constant "a" varies depending on the type of the scintillator layer.

However, in the case of using a digital photo multiplier that detects only whether each of the micro cells is turned on or off, the pattern of the decay signal of the optical signal that is output from the scintillator layer may not be detected. According to some example embodiments, while the digital photo multiplier is used, the pattern of the decay signal is detected in the reaction depth determining unit 710, to thereby determine a scintillator layer that has reacted with the gamma-rays in a plurality of scintillator layers S1 and S2.

Figure 10:
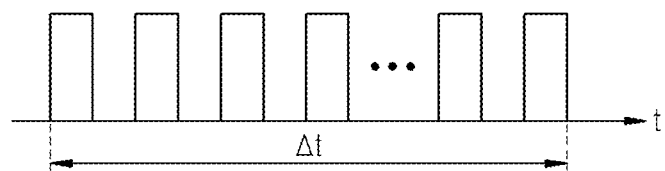
FIG. 10 is a view illustrating a method of detecting a decay signal pattern of an optical signal of scintillator layers according to some example embodiments.

FIG. 10 is a view illustrating a method that detects a decay signal pattern of an optical signal of the scintillator layer according to some example embodiments.

According to some example embodiments, the pattern of the decay signal is detected by counting the number of the pulse signals that are output from a plurality of the micro cells MC. In this case, as shown in FIG. 10, the number of the pulse signals within the standard time interval ($\Delta t$) is counted. Accordingly, if the number of the pulse signals within the standard time interval ($\Delta t$) is equal to or less than a threshold value, it may be determined that the decay of the optical signal having occurred from the scintillator has ended. The reaction depth determining unit 710 may continuously detect the number of the pulse signals per hour, and may continuously determine whether or not the number of the pulse signals per hour is reduced to a value equal to or less than the threshold value in the intervals in which the number of the pulse signals per hour is decreased.

Figure 11:
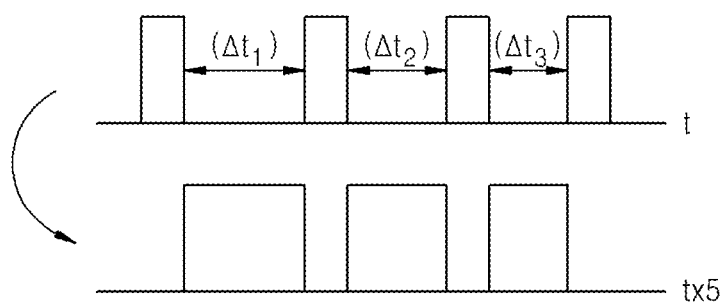
FIG. 11 is a view illustrating a method of detecting a decay signal pattern of an optical signal of scintillator layers in accordance with some example embodiments.

FIG. 11 is a view illustrating a method that detects a decay signal pattern of an optical signal of the scintillator layer in accordance with some example embodiments.

According to some example embodiments, an average value of time spans ($\Delta t1$, $\Delta t2$, $\Delta t3$) between the pulse signals that are output from a plurality of the micro cells MC is calculated, and thus it is determined the type of the scintillator layer with which gamma-rays have reacted depending on the average value of time spans ($\Delta t1$, $\Delta t2$, $\Delta t3$). In other words, if the average value of the time spans ($\Delta t1$, $\Delta t2$, $\Delta t3$) is small, it is determined that gamma-rays have reacted with the scintillator layer with the small decay time constant, and if the average value of time spans ($\Delta t1$, $\Delta t2$, $\Delta t3$) is large, it is determined that gamma-rays have reacted with the scintillator layer with the large decay time constant. In addition, the reaction depth determining unit 710 may compare the average value of time spans ($\Delta t1$, $\Delta t2$, $\Delta t3$) and a desired reference value (that may or may not be predetermined), determine the pattern of the decay signal, and determine the type of the scintillator layer with which gamma-rays have reacted.

According to some example embodiments, depending on a speed that time spans ($\Delta t1$, $\Delta t2$, $\Delta t3$) are reduced among the pulse signals outputted from a plurality of the micro cells MC, the type of the scintillator layer with which gamma-rays have reacted may be determined. In other words, if the speed that the time spans ($\Delta t1$, $\Delta t2$, $\Delta t3$) are reduced among the pulse signals is slow, it is determined that gamma-rays have reacted with the scintillator layer whose decay time constant is small, and if the speed that the time spans ($\Delta t1$, $\Delta t2$, $\Delta t3$) are reduced among the pulse signals is fast, it is determined that gamma-rays have reacted with the scintillator layer whose the decay time constant is large. Therefore, the reaction depth determining unit 710 may compare the decreasing speed of the time spans ($\Delta t1$, $\Delta t2$, $\Delta t3$) with a desired reference value (that may or may not be predetermined), determine a pattern of the decay signal, and determine the type of the scintillator layer with which gamma-rays have reacted.

In FIG. 11, the time spans (Δt1, Δt2, Δt3) among the pulse signals are more accurately measured, and in order to determine the type of the scintillator layer with which gamma-rays have reacted, it is possible to observe time spans (Δt1, Δt2, Δt3) among the pulse signals, multiplying time each of the spans (Δt1, Δt2, Δt3) by an integer (e.g., 5).

Referring back to FIG. 7, the reading unit 720 generates a PET image by referring to the signals output from a plurality of the micro cells MC and the reaction depth determination results of the reaction depth determining unit 710. The reading unit 720 generates a sinogram by using the detected signal that is obtained for each angle of incidence in the detector 110, and then applies an image reconstruction algorithm to the sinogram, to thus implement a PET image.

Figure 12:
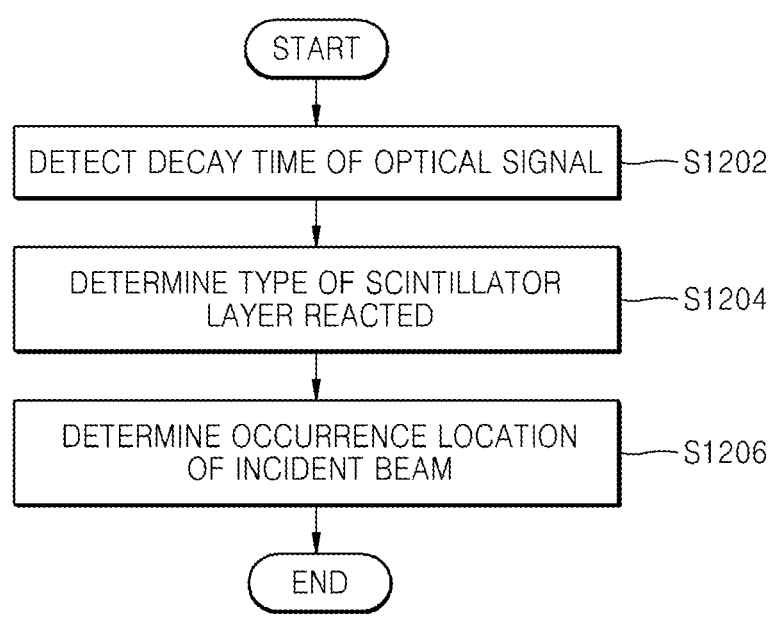
FIG. 12 is a flowchart illustrating a method of generating an image according to some example embodiments.

FIG. 12 is a flowchart illustrating a method of generating an image according to some example embodiments.

The image generating method, according to some example embodiments, detects decay time of optical signals that are output from a plurality of scintillator layers S1 and S2, from the detected signals that are output from a plurality of the micro cells MC (S1202). As described above, the decay time of the optical signal may be detected by using the number of the pulse signals that are output from a plurality of the micro cells MC per hour, by calculating an average value of time spans among the pulse signals, or by measuring the rate that time spans decrease among the pulse signals.

Next, based on the decay time of the optical signal, the type of scintillator layer with which gamma-rays have reacted is determined (S1204). As described above, depending on the decay pattern of the decay signal, the type of the scintillator layer may be determined.

Next, by using the detected signals that are output from a plurality of the micro cells MC and the information on the kind of the scintillator layer with which gamma-rays have reacted, the occurrence location of the gamma-rays is determined (S1206). If the occurrence location of the gamma-rays is determined, a sinogram is generated, and then an image reconstruction algorithm is applied to the sinogram, to thus implement a PET image.

Figure 13:
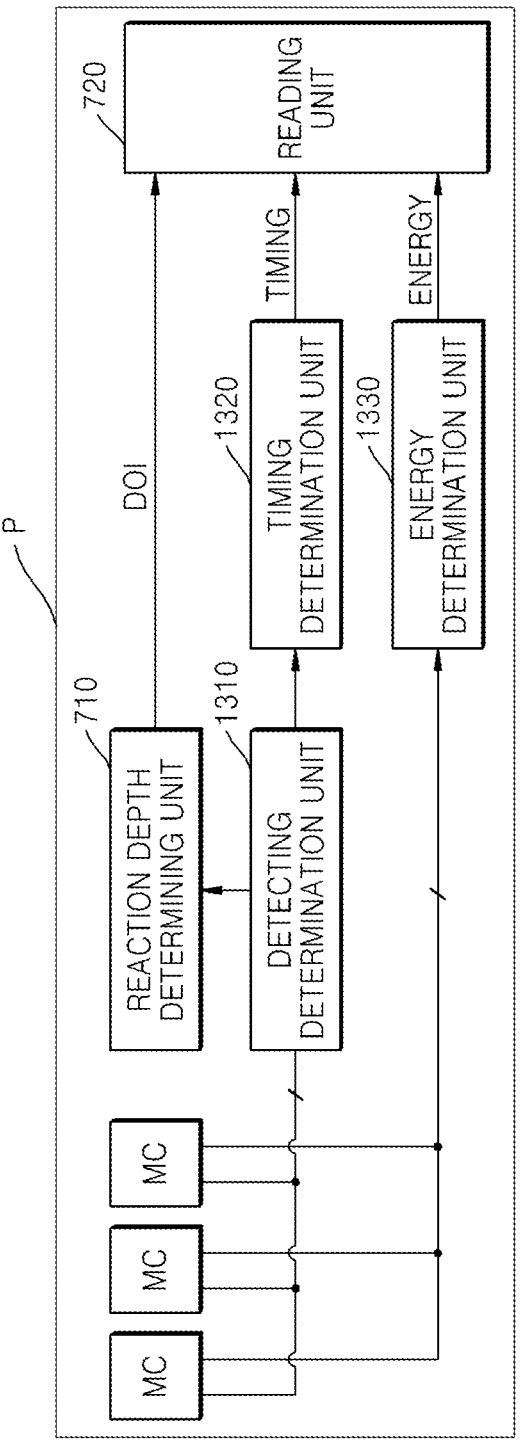
FIG. 13 is view illustrating a structure of pixels of a silicon photo multiplier according to some example embodiments.

FIG. 13 is view illustrating a structure of pixels P of a silicon photo multiplier SiPM according to some example embodiments.

Each of pixels P includes a plurality of the micro cells MC, and a reaction depth determining unit 710, a reading unit 720, a detecting determination unit 1310, a timing determination unit 1320, and an energy determination unit 1330.

The detecting determination unit 1310 determines whether or not the detected pulse signals are valid signals, from the pulse signals that are output from a plurality of the micro cells MC. In other words, the detecting determination unit 1310 determines whether or not the pulse signals are ones by the optical signals which are output from the scintillator layers or by dark pulses.

According to some example embodiments, if the number of pulses per unit hour is equal to or greater than a threshold value, the detecting determination unit 1310 recognizes that the pulse signals are ones by the optical signals which are generated from the scintillator layers, to thus determine the pulse signals as valid signals.

The timing determination unit 1320 judges whether or not the pulse signals are valid signals, based on the timing of the pulse signals. Referring to FIG. 4, in the case of generating gamma-rays from the tracer of the object, the gamma-rays are emitted in the directions approximately opposite to each other. Therefore, in the detector 110, gamma-rays are detected by the pixels P facing each other at the same time. The timing determination unit 1320 determines whether or not gamma-rays are detected by the pixels P facing each other at the same time, and determines whether or not the pulse signals are valid signals. In other words, the timing determination unit 1320 determines that the pulse signals are valid, in the case that gamma-rays are detected by the pixels P facing each other, and the detected timing of each pixel P corresponds, but determines the pulse signals are not valid, in the case that the detected timing of each pixel P does not correspond.

The energy determination unit 1330, determines an energy level of the gamma-rays that are emitted from the tracer from the pulse signals that are output from a plurality of the micro cells MC, and determines whether or not the detected signals are valid. As mentioned earlier, in the case of the positrons that are destroyed due to the combination of the electrons and the positrons that are emitted from the tracer, a pair of gamma-rays with energy of about 511 keV are emitted. The energy of the gamma-rays may be determined from the number of the photons that are emitted in the scintillator layer. If gamma-rays of another energy level are detected, these gamma-rays are the invalid signals. The energy determination unit 1330 measures the number of the photons per unit area, by using the pulse signals, and if the number of the photons corresponds to about 511 keV, determines that the pulse signals are valid signals. Otherwise the energy determination unit 1330 may determine the pulse signals are invalid signals.

If the pulse signals are determined as valid detected signals by the detecting determination unit 1310, the timing determination unit 1320, and the energy determination unit 1330, the reading unit 720 determines the occurrence location of the gamma-rays from the type of the scintillator layer (depth of interaction (DOI)) having reacted with the gamma-rays, which has been determined from the reaction depth determining unit 710 and the detected signals of a plurality of the micro cells MC, and then after generating sinogram, generates a PET image.

According to some example embodiments, invalid dark pulses are removed, thus generating a more accurate PET image.

Figure 14:
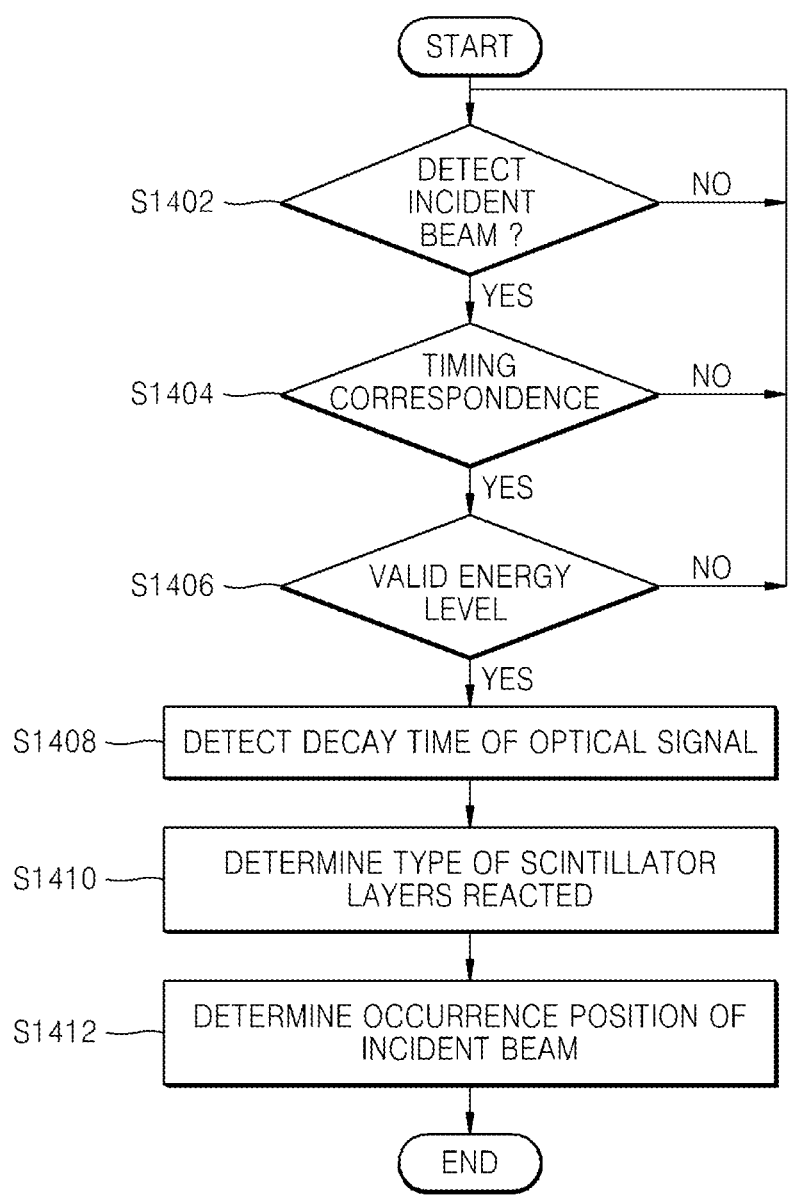
FIG. 14 is a flowchart illustrating a method of generating an image in accordance with some example embodiments.

FIG. 14 is a flowchart illustrating a method of generating an image in accordance with some example embodiments.

First of all, if the pulse signals are output, it is determined whether or not the pulse signals are valid from the number of the pulse signals (S1402). If the number of the pulse signals per hour is equal to or greater than the threshold value, it may be determined that the pulse signals are valid.

In addition, if the pulse signals are output from the pixels P that are located at the different positions, it is determined whether or not the timing of the pulse signals of the pixels P that are located at the different positions correspond to each other (S1404). If the timing of the pulse signals corresponds to each other, it may be determined that the pulse signals are valid.

By measuring the energy level of the gamma-rays from the number of the pulse signals, it is determined whether or not the pulse signals are valid (S1406). By detecting the number of the pulse signals per unit area, if gamma-rays correspond to the desired energy level (that may or may not be predetermined; for example, 511 keV), it may be determined that the pulse signals are valid.

In the case that the detected pulse signals are valid, as stated previously, the decay time of the optical signal is detected (S1408), the type of the scintillator layers having reacted with the gamma-rays is determined (S1410), and the occurrence position of the gamma-rays is determined (S1412).

As described above, according to the one or more of the above embodiments of the present invention, in a PET system using a digital photo multiplier, a decay speed or a decay degree of an optical signal which is output from a scintillator is determined, to thus enhance a resolution of a PET image.

While example embodiments have been particularly shown and described, it will be understood by those of ordinary skill in the art that various changes in form and details may be made therein without departing from the spirit and scope of the present invention as defined by the following claims.

In addition, other embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., read-only memory (ROM), floppy disks, hard disks, etc.) and optical recording media (e.g., compact disc read-only memories (CD-ROMs), or digital video discs (DVDs)), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An apparatus for generating an image, the apparatus comprising:
    a plurality of scintillator layers configured to convert an incident beam into an optical signal;
    a plurality of micro cells configured to turn on or off based on whether or not the micro cells detect the optical signal, and to output pulse signals;
    a reaction depth determining unit configured to detect a decay pattern of the optical signal based on an average value of time spans between the pulse signals, and to determine a type of scintillator layer with which the incident beam has reacted based on the decay pattern; and
    a reading unit configured to determine an occurrence location of the incident beam based on the type of the scintillator layer and to generate a photographed image.

2. The apparatus of claim 1, further comprising:
    a detecting determination unit configured to determine whether or not the incident beam is detected depending on the pulse signals.

3. The apparatus of claim 2, wherein the micro cells are disposed in a form of a ring so that a light receiving surface is directed toward a center of the ring, and
    wherein the apparatus further comprises a timing determination unit configured to determine validity of the incident beam depending on whether or not detecting timings of the micro cells from which the pulse signals have been detected correspond to each other.

4. The apparatus of claim 1, wherein the reaction depth determining unit is further configured to determine whether or not a number of the pulse signals per hour is equal to or less than a threshold value, to thus detect decay time of the optical signal.

5. The apparatus of claim 1, wherein the reaction depth determining unit is further configured to determine whether or not the average value is equal to or less than a threshold value, to thus detect decay time of the optical signal.

6. The apparatus of claim 1, wherein the reaction depth determining unit is further configured to detect decay time of the optical signal based on a rate of decreasing of the time spans between the pulse signals.

7. The apparatus of claim 1, further comprising:
    an energy determination unit configured to measure an energy level of the incident beam, to determine whether or not the detected optical signal is valid, based on the pulse signals.

8. A method of generating an image of an object in an apparatus comprising a plurality of scintillator layers, a plurality of micro cells, a reaction depth determining unit and a reading unit, the method comprising:
    converting, by the scintillator layers, an incident beam into an optical signal, wherein the scintillator layers output the optical signal;
    detecting, by the micro cells, the optical signal, wherein the micro cells are turned on or turned off, based on whether or not the micro cells detect the optical signal generated and output from the scintillator layers, to thus output pulse signals;
    detecting, by the reaction depth determining unit, a decay pattern of the optical signal based on an average value of time spans between the pulse signals;
    determining, by the reaction depth determining unit, a type of scintillator layer with which an incident beam has reacted based on the decay pattern;
    determining, by the reading unit, an occurrence location of the incident beam based on the type of the scintillator layer; and
    generating, by the reading unit, the image of the object based on the occurrence location of the incident beam.

9. The method of claim 8, further comprising:
    determining, by a detecting determination unit of the apparatus, whether or not the incident beam is detected, depending on the pulse signals.

10. The method of claim 9, wherein the micro cells are disposed in a form of a ring, so that a light receiving surface is directed toward a center of the ring, and
    wherein the method for generating the image further comprises determining, by a timing determination unit of the apparatus, validity of the incident beam depending on whether or not detection timings of the micro cells from which the pulse signals have been detected correspond to each other.

11. The method of claim 8, wherein the determining of the type of the scintillator layer with which the incident beam has reacted comprises determining whether or not a number of the pulse signals per hour is equal to or less than a threshold value, to thus detect decay time of the optical signal.

12. The method of claim 8, wherein the determining of the type of the scintillator layer with which the incident beam has reacted comprises determining whether or not the average value is equal to or less than a threshold value, to thus detect decay time of the optical signal.

13. The method of claim 8, wherein the determining of the type of the scintillator layer with which the incident beam has reacted comprises detecting decay time of the optical signal based on a rate of decreasing of the time spans between the pulse signals.

14. The method of claim 8, further comprising:
  measuring, by an energy determination unit of the apparatus, an energy level of the incident beam; and
  determining, by the energy determination unit, whether or not the detected optical signal is valid based on the pulse signals.

* * * * *